US012168284B2

(12) United States Patent
Doroslovac et al.

(10) Patent No.: US 12,168,284 B2
(45) Date of Patent: *Dec. 17, 2024

(54) ANTI-SLIP HEX ALLEN TOOL

(71) Applicants: Ruth Doroslovac, Port Washington, OH (US); Robert Doroslovac, Massillon, OH (US); George Doroslovac, Port Washington, OH (US)

(72) Inventors: Ruth Doroslovac, Port Washington, OH (US); Robert Doroslovac, Massillon, OH (US); George Doroslovac, Port Washington, OH (US)

(73) Assignee: BGD Unlimited, LLC, Massillon, OH (US)

( * ) Notice: Subject to any disclaimer, the term of this patent is extended or adjusted under 35 U.S.C. 154(b) by 310 days.

This patent is subject to a terminal disclaimer.

(21) Appl. No.: 17/841,995

(22) Filed: Jun. 16, 2022

(65) Prior Publication Data

US 2023/0015867 A1 Jan. 19, 2023

Related U.S. Application Data

(63) Continuation-in-part of application No. 17/376,710, filed on Jul. 15, 2021, now Pat. No. 11,759,923.

(51) Int. Cl.

| | |
|---|---|
| ***B25B 23/10*** | (2006.01) |
| ***B25B 15/00*** | (2006.01) |
| ***B25B 23/00*** | (2006.01) |

(52) U.S. Cl.

CPC .......... *B25B 23/108* (2013.01); *B25B 15/008* (2013.01); *B25B 23/0035* (2013.01)

(58) Field of Classification Search

CPC ... B25B 15/004; B25B 15/008; B25B 23/105; B25B 23/108; B25B 23/0035

See application file for complete search history.

(56) References Cited

U.S. PATENT DOCUMENTS

| | | | | |
|---|---|---|---|---|
| 4,105,056 A | | 8/1978 | Arnn | |
| 5,105,690 A | * | 4/1992 | Lazzara | B25B 23/108 81/436 |
| 6,152,000 A | | 11/2000 | Mowins | |
| 8,302,255 B2 | | 11/2012 | Lin | |
| 8,640,575 B2 | | 2/2014 | Huang | |
| 10,081,094 B2 | * | 9/2018 | Doroslovac | B25B 23/105 |
| 10,286,527 B2 | * | 5/2019 | Chen | B25B 15/008 |
| 10,780,556 B2 | * | 9/2020 | Kukucka | B25B 15/004 |
| 10,967,488 B2 | * | 4/2021 | Kukucka | F16B 23/0069 |
| 11,154,969 B2 | | 10/2021 | Kukucka et al. | |
| 11,554,467 B2 | * | 1/2023 | Lin | B25B 15/008 |
| 11,602,828 B2 | * | 3/2023 | Kukucka | B25B 23/108 |

(Continued)

*Primary Examiner* — David B. Thomas

(74) *Attorney, Agent, or Firm* — Harpman & Harpman

(57) ABSTRACT

A hex headed bit and socket for enhanced non-slip application of torque force having a hex head with contoured fastener engagement surfaces. The contoured fastener engagement surface extends transversely in angular longitudinal inclination. Defined multiple engagement edges correspondingly embed themselves during rotational engagement within the so engaged fastener pulling the hex head bit into the engaged fastener imparting enhanced translateral points of tool engagement for extraction. Recessed areas on flat hexagonal free end tool portion defining alternate spaced pairs of parallel engagement edges.

1 Claim, 17 Drawing Sheets

(56) References Cited

U.S. PATENT DOCUMENTS

| | | | | | |
|---|---|---|---|---|---|
| 11,759,923 | B2 * | 9/2023 | Doroslovac | B25B 23/0035 81/436 |
| 11,787,023 | B2 * | 10/2023 | Doroslovac | B25B 15/008 81/53.2 |
| 2013/0298737 | A1 * | 11/2013 | Lukes | B25B 15/02 81/436 |
| 2015/0335368 | A1 * | 11/2015 | Auger | B25B 15/004 81/436 |
| 2016/0158926 | A1 * | 6/2016 | Wang | B25B 15/008 81/436 |
| 2017/0312897 | A1 * | 11/2017 | Doroslovac | B25B 15/008 |
| 2019/0209219 | A1 * | 7/2019 | Auger | A61B 17/888 |
| 2021/0146510 | A1 * | 5/2021 | Lin | B25B 23/108 |
| 2021/0220977 | A1 * | 7/2021 | Kukucka | B25B 23/108 |
| 2022/0040830 | A1 * | 2/2022 | Kukucka | B25B 23/108 |
| 2022/0281085 | A1 * | 9/2022 | Kukucka | B25B 15/004 |
| 2023/0321799 | A1 * | 10/2023 | Su | B25B 15/004 81/436 |

* cited by examiner

ANTI-SLIP HEX ALLEN TOOL

BACKGROUND OF THE INVENTION

1. Technical Field

This invention is directed to hex headed bits for the use with hex headed fasteners as an anti-slip multi-directional drive bit for driving and removing of hex headed fasteners. Such tool bits known and used in the art are defines as six sided flat surfaces for engagement and correspondingly configured receptacles for rotation to tighten and loosen as needed. Such fastener bolt designs may be compromised during use due to metal fatigue, rust and general abuse imparted by improper tool use thus making them difficult to engage by a typical hex headed tool.

2. Description of Prior Art

Prior art hex wrench and bit tool configurations can be seen in the following U.S. Pat. Nos. 4,105,056, 6,152,000, 8,302,255 and 8,640,575.

In U.S. Pat. No. 4,105,056, a non-slip screwdriver can be seen having a grooved foot portion from the driver blade with oppositely disposed parallel engagement grooves there across defining recessed surfaces.

U.S. Pat. No. 6,152,000 is directed to a driver bit and driver tool having a plurality of projections formed on at least one surface of the fastener engagement shank portion to enhance the tool to fastener registration engagement.

U.S. Pat. No. 8,302,255 illustrates a hexagonal wrench head with longitudinal groove adjacent the respective side surfaces edge intersections there along.

U.S. Pat. No. 8,640,575 discloses a ball end hex wrench wherein a groove is formed within the contoured multiple sides longitudinally.

SUMMARY OF THE INVENTION

The present invention provides a driver bit for engaging and maintaining efficient contact within a fastener to transfer rotational force from the drive bit to the fastener while maintaining proper engagement therewith. Contoured tapered engagement surface channel cuts within alternating flat hex bit surfaces define directional engagement edges that dig into the registering fastener surfaces pulling the driver bit down within the fastener maintaining fastener engagement during rotational torque input.

DETAILED DESCRIPTION OF THE INVENTION

Referring to FIGS. 1-7 of the drawings, an anti-slip socket box end hex bit 10 of the invention can be seen having a cylindrical screw bit body 11 with a hex shank fastener engagement socket portion 12 extending therefrom.

Figure 1:
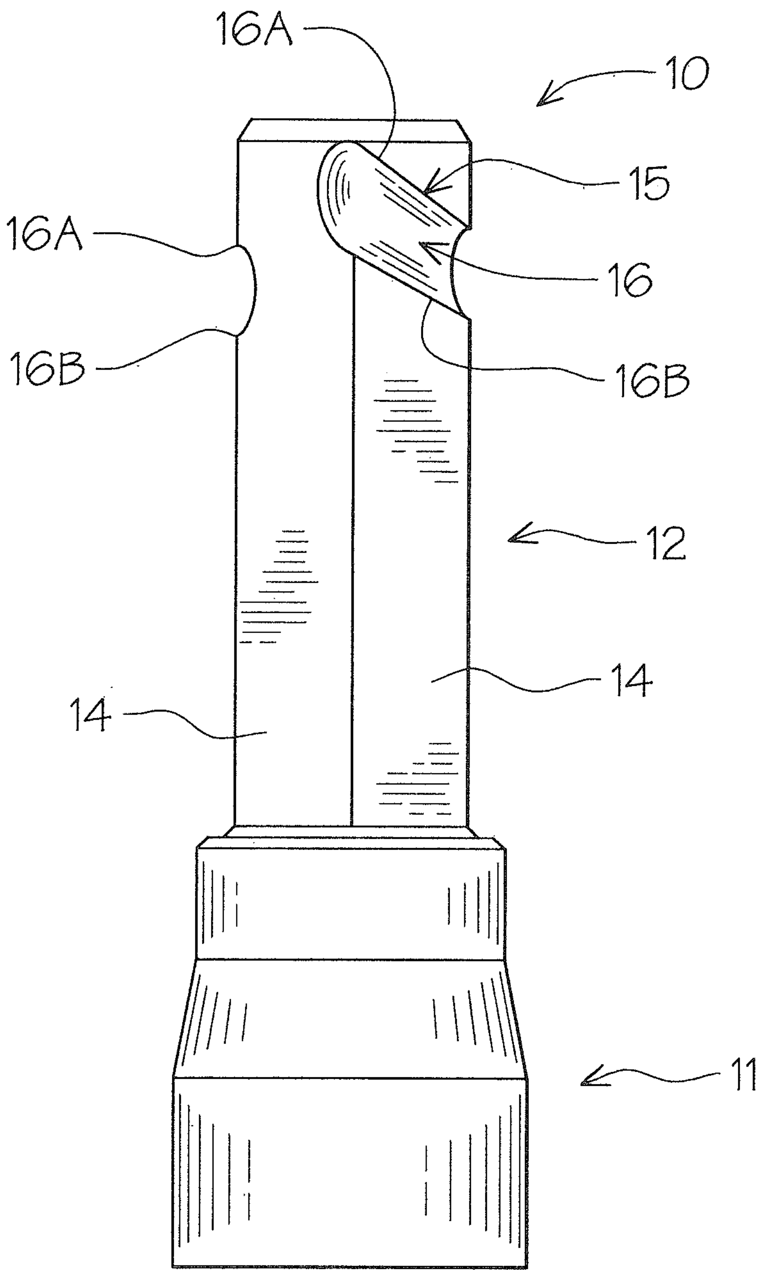
FIG. 1 is an enlarged front elevational view of the anti-slip hex socket bit of the invention.
Figure 2:
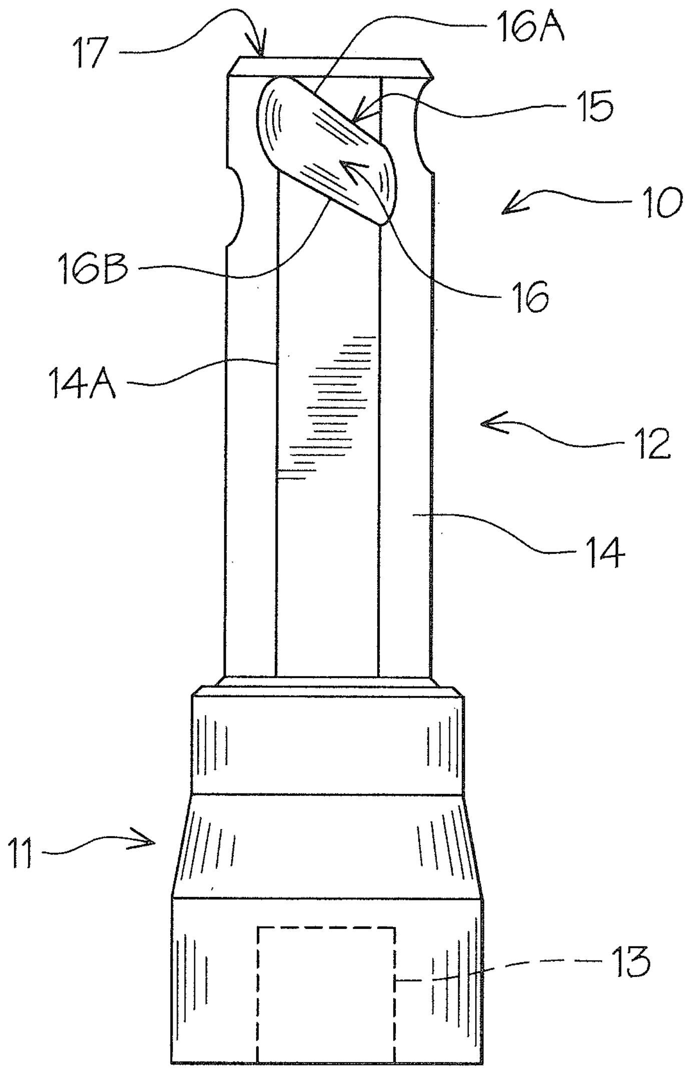
FIG. 2 is an enlarged rear elevational view thereof.
Figure 3:
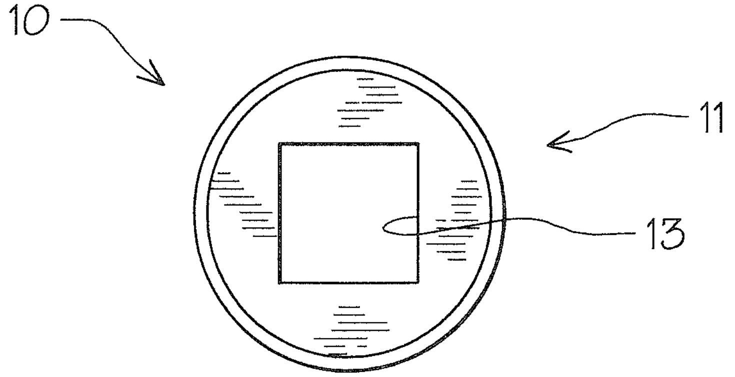
FIG. 3 is an enlarged bottom plan view thereof.
Figure 4:
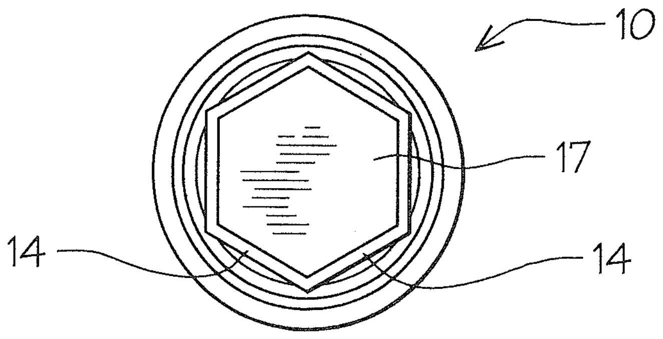
FIG. 4 is an enlarged top plan view thereof.
Figure 5:
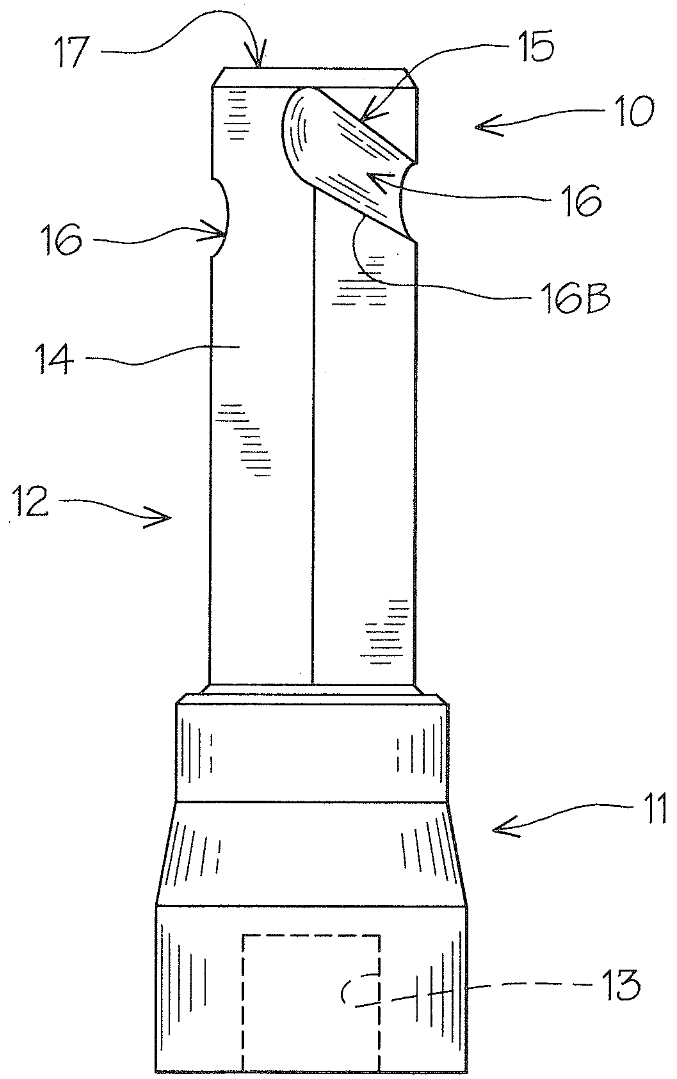
FIG. 5 is an enlarged side elevational view of the anti-slip hex socket bit of the invention.
Figure 6:
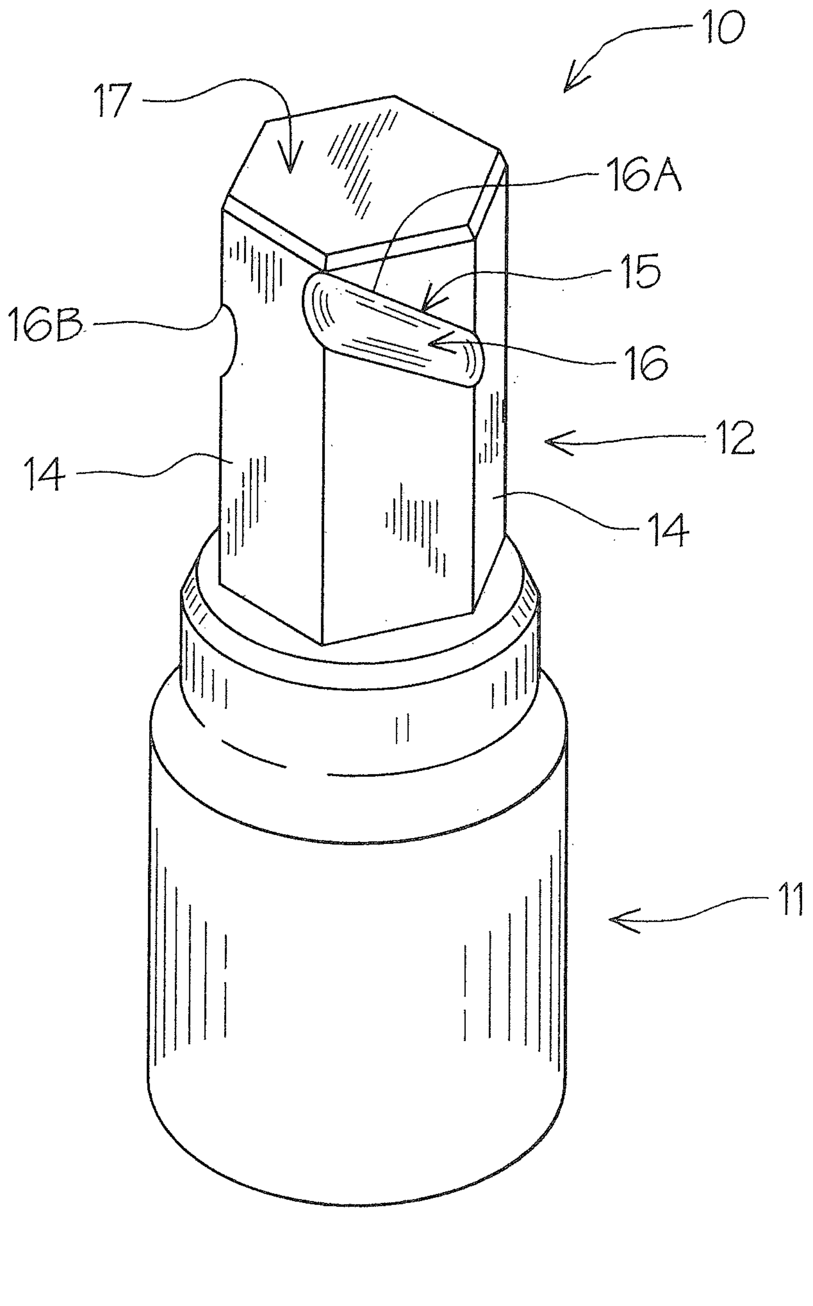
FIG. 6 is an enlarged top perspective view thereof.
Figure 7:
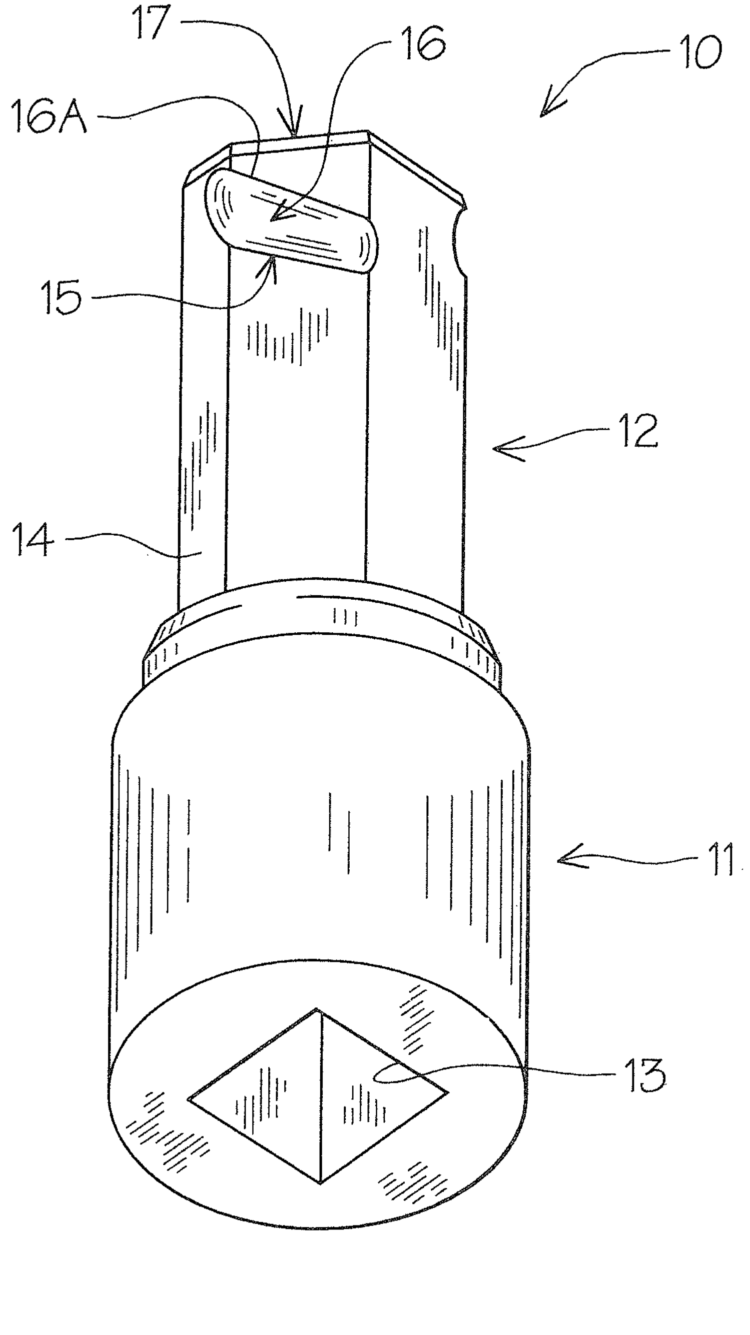
FIG. 7 is an enlarged bottom perspective view thereof.
Figure 8:
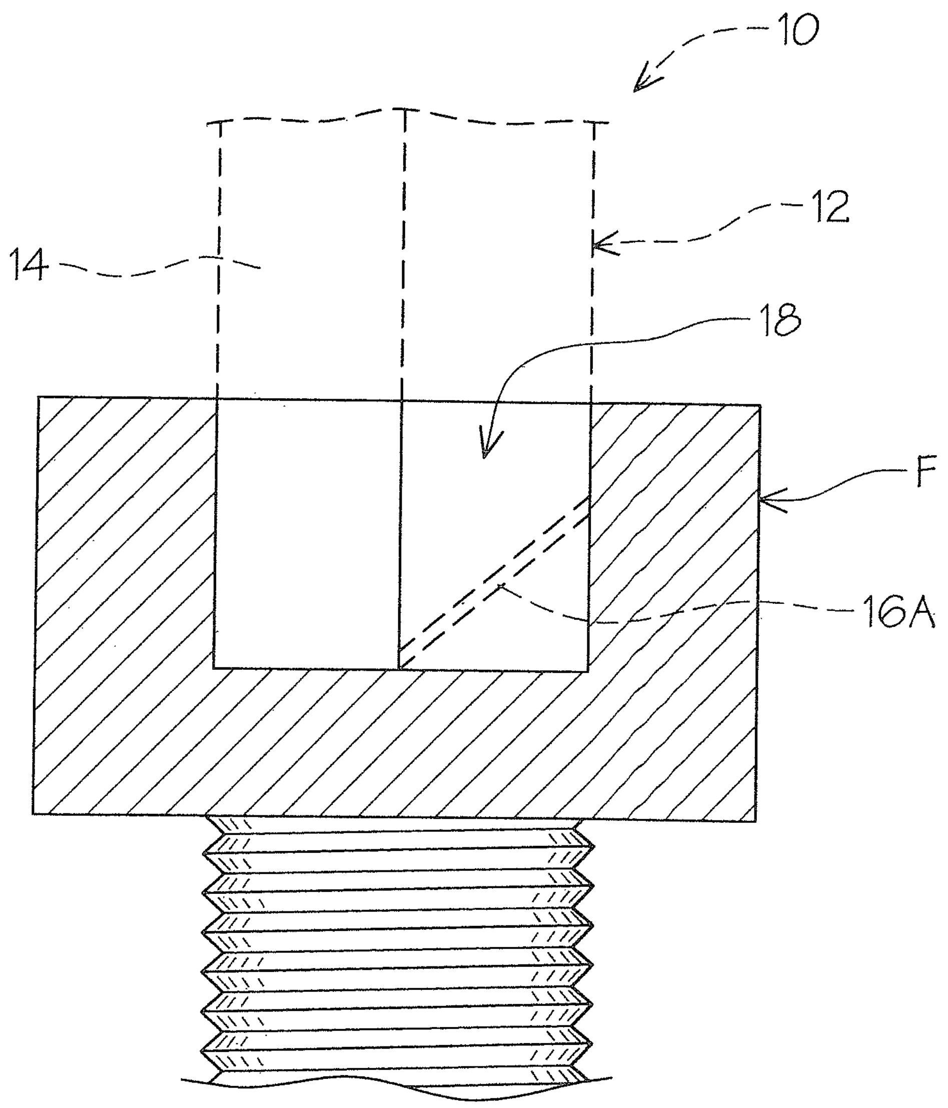
FIG. 8 is an enlarged graphic representation of the present invention engaged in a fastener illustrating points of contact in solid and broken lines.
Figure 9:
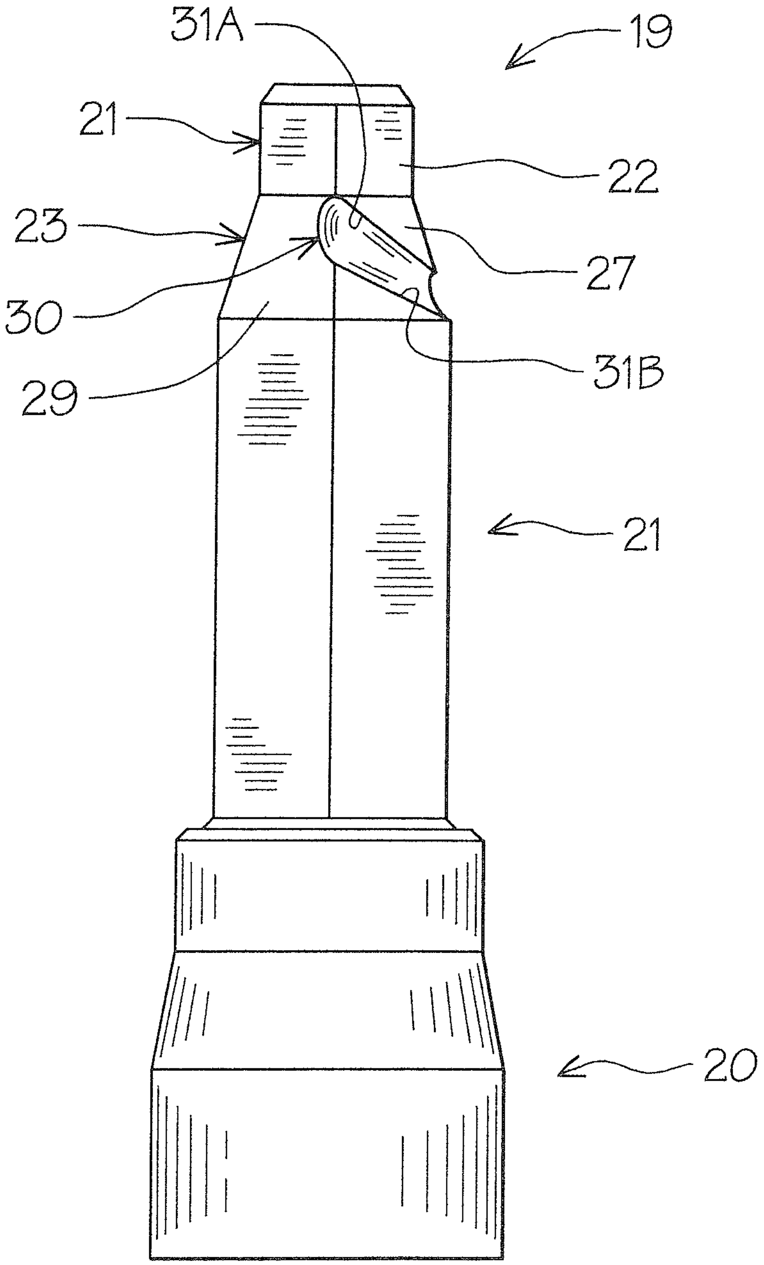
FIG. 9 is an enlarged front elevational view of an alternate form of the anti-slip hex socket bit of the invention.

A driver engagement bore 13, best seen in FIG. 8 of the drawings, extends into the cylinder screw bit body 11 and is shaped to receive a socket fitting member of a socket driver wrench, not shown, as will be evident to those skilled and well known in the art.

The hex engaged shank portion 12 has a plurality of elongated flat fastener engagement surfaces 14 of equal transverse and longitudinal dimension there about so as to define a hex tool bit configuration known within the art. The fastener engagement socket is therefore hexagonal with a plurality of flat engagement surfaces spaced radially about the longitudinal axis of the shank portion 12.

Some of the flat hex engagement surfaces 14 have a contoured C-shaped fastener engagement channel cut 15 therein. Each of the contoured engagement channel cuts 15 extend angularly across its respective hexagonal surface 14 having a contoured transverse tapered interior surface 16. The engagement channel cut 15 is also tapered longitudinally between respective opposing intersecting flat engagement surfaces 14A and 14B, best seen in FIG. 2 of the drawings.

The contoured transverse tapered interior surface 16 of the engagement channel cut 16 is of a modified C-shape defining a pair of upstanding elongated fastener engagement lateral edges 16A and 16B extending in angular spaced relation from the shank 12 fastener insert end 17. The so-configured engagement channel cut 15 being selectively cut in alternate engagement surfaces 14 about the hex bit 10 indirect contact thereby providing multiple points of enhanced non-slip fastener engagement as seen in FIG. 8 of the drawings graphically. This channel engagement orientation will thereby accommodate both undamaged and damaged fasteners, not shown, as will be discussed in greater detail hereinafter.

The contoured tapered interior surface 16 of each engagement channel cut 15 thereby defines both a primary fastener lateral engagement edge 16A and the secondary lateral edge 16B in spaced orientation thereby provides for the displacement of fastener material as needed during rotational engagement assuring a secure and active multiple point engagement regardless of the fastener's condition within the fastener's receiving area 18. The contoured tapered interior modified C-shape channel cut 16 is tapered transversely from the elongated primary fastener engagement lateral edge 16A upwardly to the so defined secondary fastener engagement lateral edge 16B as seen best in FIG. 7 of the drawings It will be seen that the hereinbefore described alternating placement of the unique contoured engagement channel cut 15 in three of the fastener engagement surfaces 14 thereby having a snug contact with the corresponding undamaged interior surfaces of the fastener's receiving area 18 and three engagement surfaces with the contoured center engagement channel cut 15 which work in concert to achieve an enhanced grip within the engagement fastener regardless of the relative fastener's condition as hereinbefore described.

During operation, the angular orientation of the contoured engagement channel cut 15's lateral edges 16A will engage within the fastener F and pull the hex bit 10 increasingly into the fastener's receiving area 18 thus maintaining the enhanced trilateral contact so achieved. It will be evident that the hex bit 10 engagement channel cut 15 will protrude inwardly towards the fastener at a corresponding scale percentage based on the size of the tool. It will also be apparent that the multiple contoured engagement channel cut 15's lateral edges 16A and 16B will allow during use "pivoting" of the hex bit tool 10 when the fastener engagement surfaces are compromised thus, as noted, forcing the hex bit tool to embed itself in the fastener to form a deeper and thereby better grip engagement with the compromised fastener.

Referring now to FIGS. 9-14 of the drawings, an alternate form can be seen as an anti-slip socket box end hex bit 19 of the invention having a tool engagement portion 20 and an oppositely disposed hex shank fastener engagement socket portion 21 with a plurality of equal dimension hexagonal elongated flat engagement surfaces 22 there about.

Figure 10:
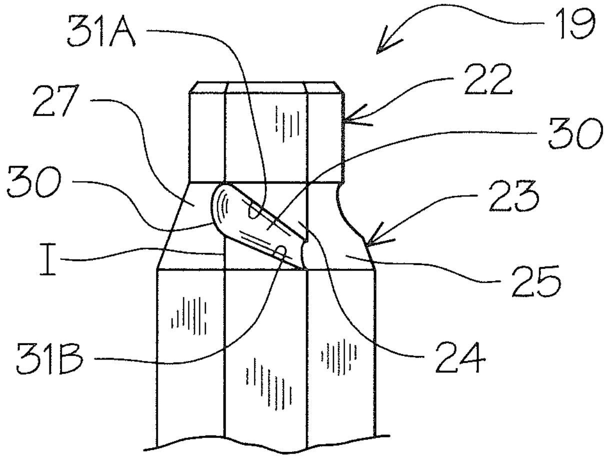
FIG. 10 is an enlarged partial rear elevational view thereof.
Figure 11:
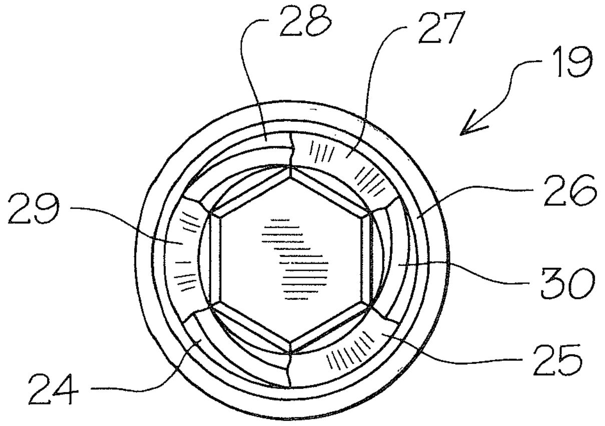
FIG. 11 is an enlarged top plan view thereof.
Figure 12:
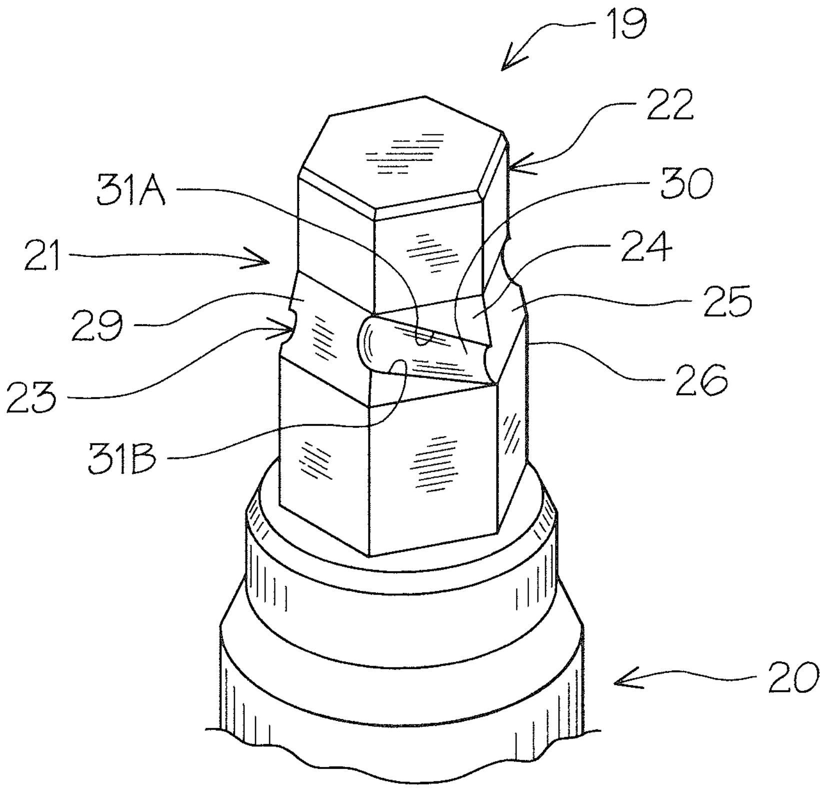
FIG. 12 is an enlarged top and front perspective view thereof.

A secondary set of flat engagement surfaces 23 are tapered longitudinally therefrom defining individual incline engagement surfaces 24-29 spaced there about, best seen in FIGS. 10 and 11 of the drawings. Each alternating secondary flat engagement surfaces 24, 26 and 28 have a contoured C-shaped fastener engagement channel 30 cut therein. Each contoured engagement channel 30 extends angularly across the respective tapered hexagonal surfaces 23, each having a contoured transverse tapered interior surface 31 which extends longitudinally between the respective intersections I of the inclined engagement surfaces 22.

The corresponding contoured interior surface 31 of the C-shape channel defines a pair of upstanding elongated fastener engagement edges 31A and 31B extending in spaced relation to one another.

The orientation and defined shape of the engagement channels 30 will provide progressive engagement within a fastener 32 in the same manner as the hereinbefore described primary form of the anti-slip socket box end hex bit 10 of the invention.

Figure 13:
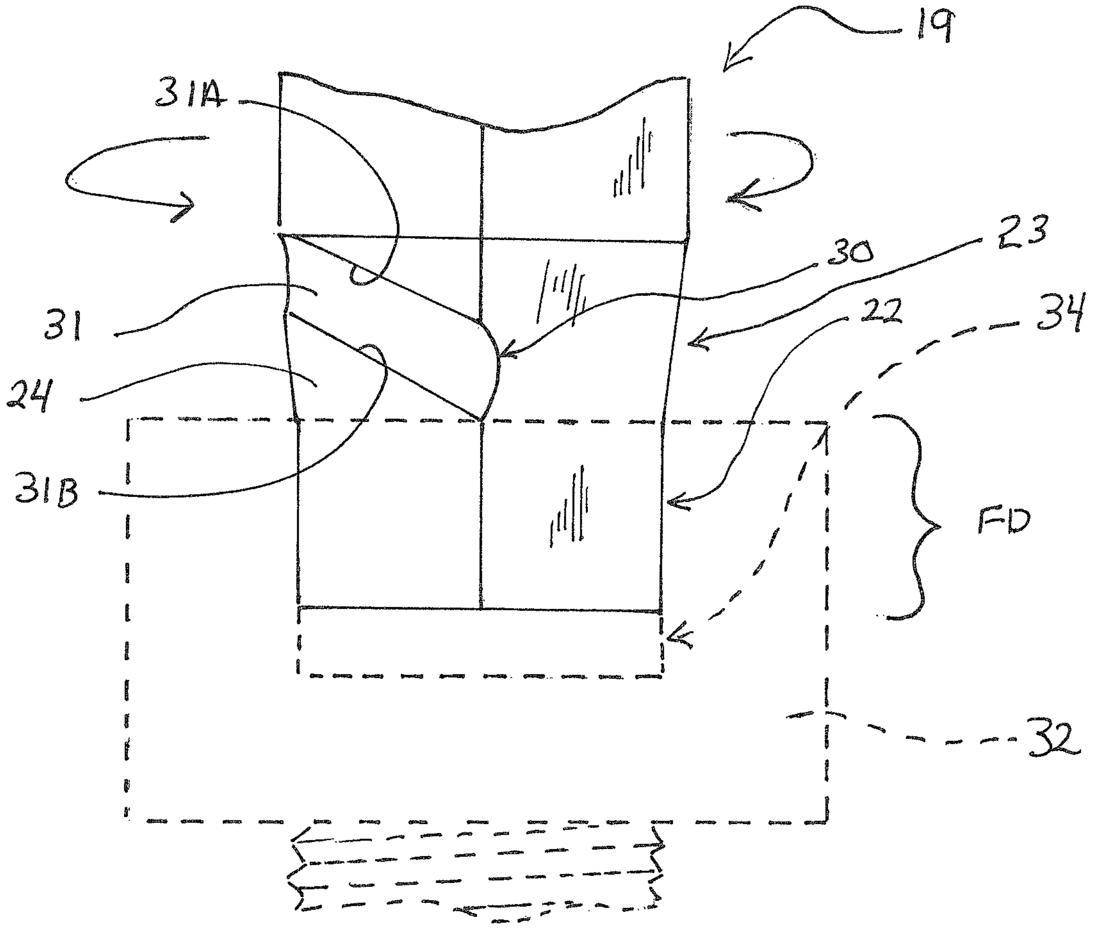
FIG. 13 is an enlarged partial front elevational view of the alternate anti-slip hex socket bit engaged in a fastener representation.
Figure 14:
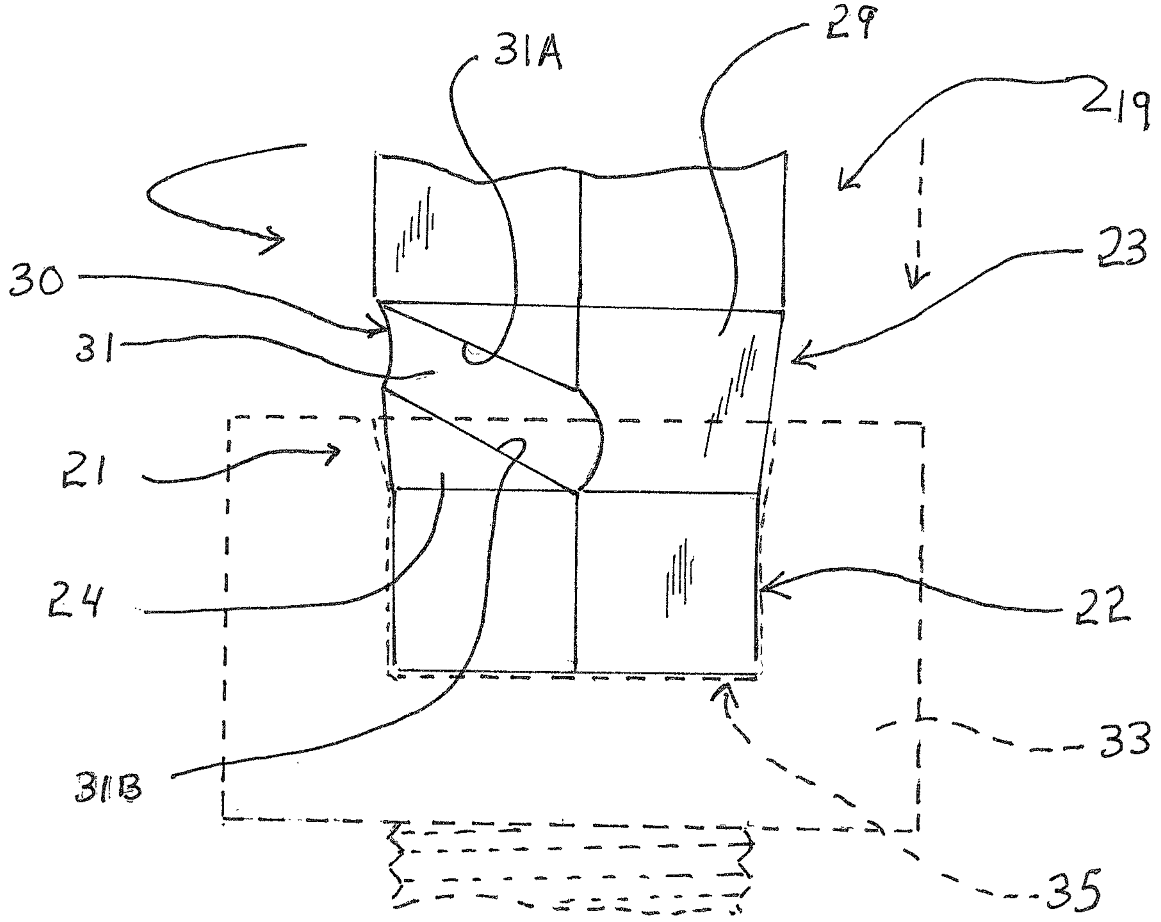
FIG. 14 is an enlarged partial front elevational view thereof engaged in a damaged fastener.
Figure 15:
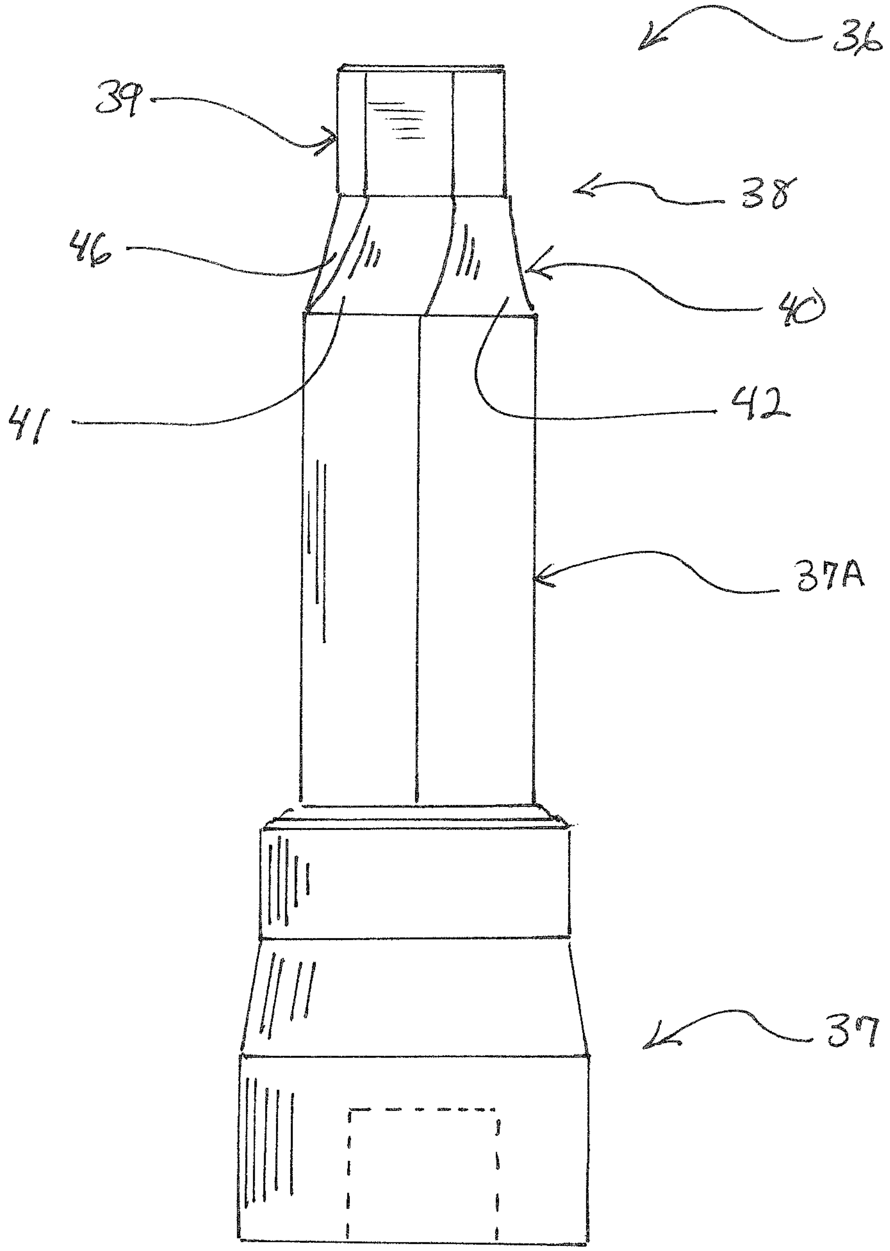
FIG. 15 is an enlarged front elevational view of a second alternate anti-slip hex socket bit engagement fastener representation.
Figure 16:
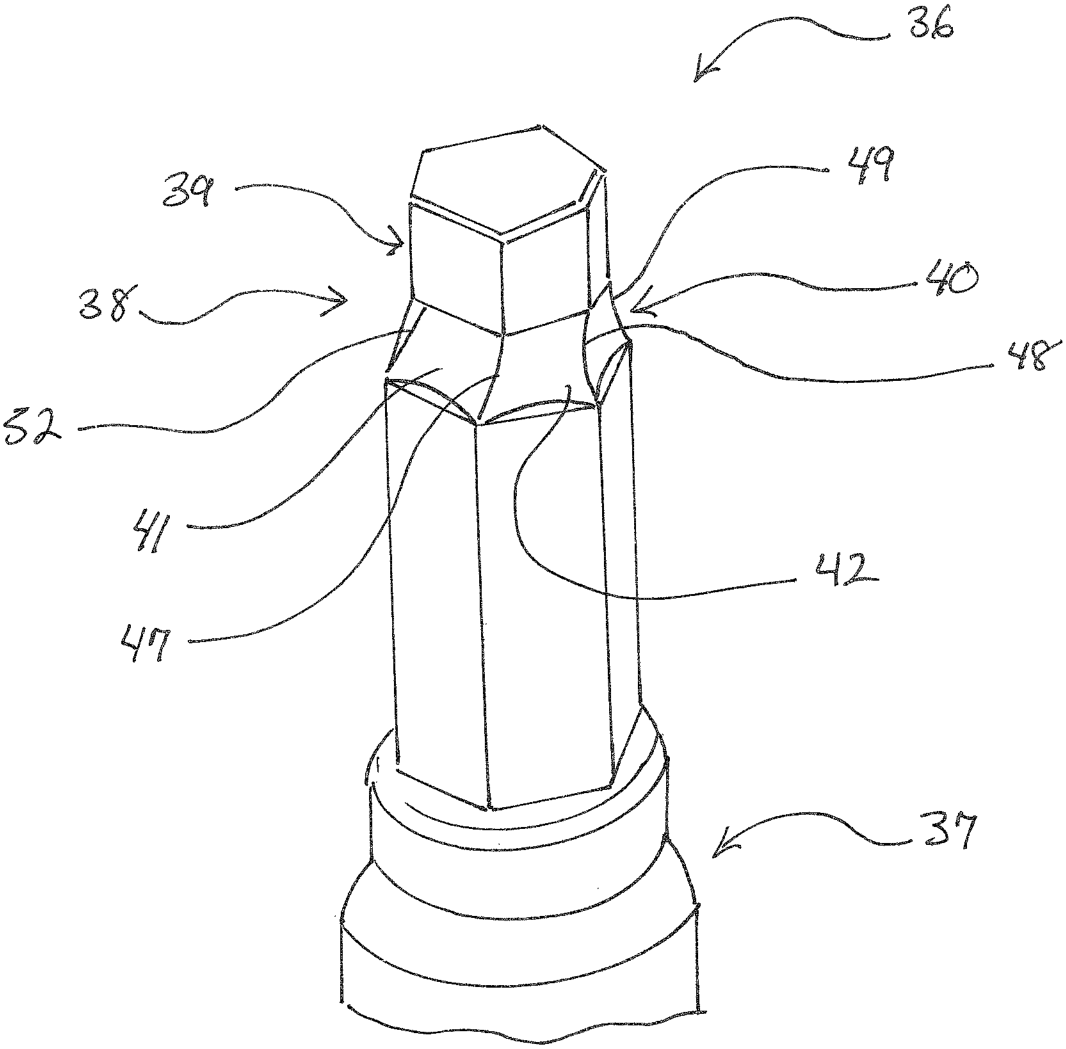
FIG. 16 is an enlarged top perspective view thereof.

Referring now to FIGS. 13 and 14 of the drawings, the alternate hex tool bit 19 of the invention can be seen engaging a non-damaged fastener 32 and a damaged fastener 33, shown in broken lines respectively, wherein the hexagonal elongated flat engagement surfaces 22 are engaged in the non-damaged fastener 32 to a depth of approximately 75% of the fastener's socket 34 indicated at FD allowing for fastener 32 rotation, as required.

Correspondingly, referring to FIG. 14 of the drawings, the damaged fastener 33 socket 35 is engaged by the alternate hex tool bit 19 will be engaged by the corresponding fastener engagement channel 13 respective edges 31A and 31B progressively as the tool descends into the damaged fastener socket 35 to establish a positive grip thus enabling rotational input force by the tool bit 19 to the damaged fastener 33 for insertion or removal, as required.

The progressive engagement will correspond to the relative insertion depth required enabled by the secondary set of flat tapered engagement surfaces 23 and the fastener engagement channel 30 therein defining the inclined tool surfaces 24-29 with their respective contoured C-shaped channel fastener engagements 30 achieving fastener rotation thereby.

This combination of angular oriented flat engagement surfaces 23 with multiple selective positioning alternating engagement channel cuts 30 will thereby provide multiple points of enhanced focus tool engagement regardless of fastener's condition in either rotational direction providing a superior grip and hold currently unavailable within the art.

Referring now to FIGS. 15-18 of the drawings, a second alternate form of the anti-slip socket box and hex bit 36 of the invention can be seen having a tool engagement portion 37 with an oppositely disposed hex shank 37A and a fastener end engagement socket portion 38 and a plurality of equally dimensioned hexagonal elongated flat engagement surfaces 39 there about. A set of contoured fastener engagement surfaces 40 are tapered both longitudinally and transversely extending curvilinear in angular twist orientation defining individual contoured inclined engagement surfaces 41-46 spaced there about.

Figure 17:
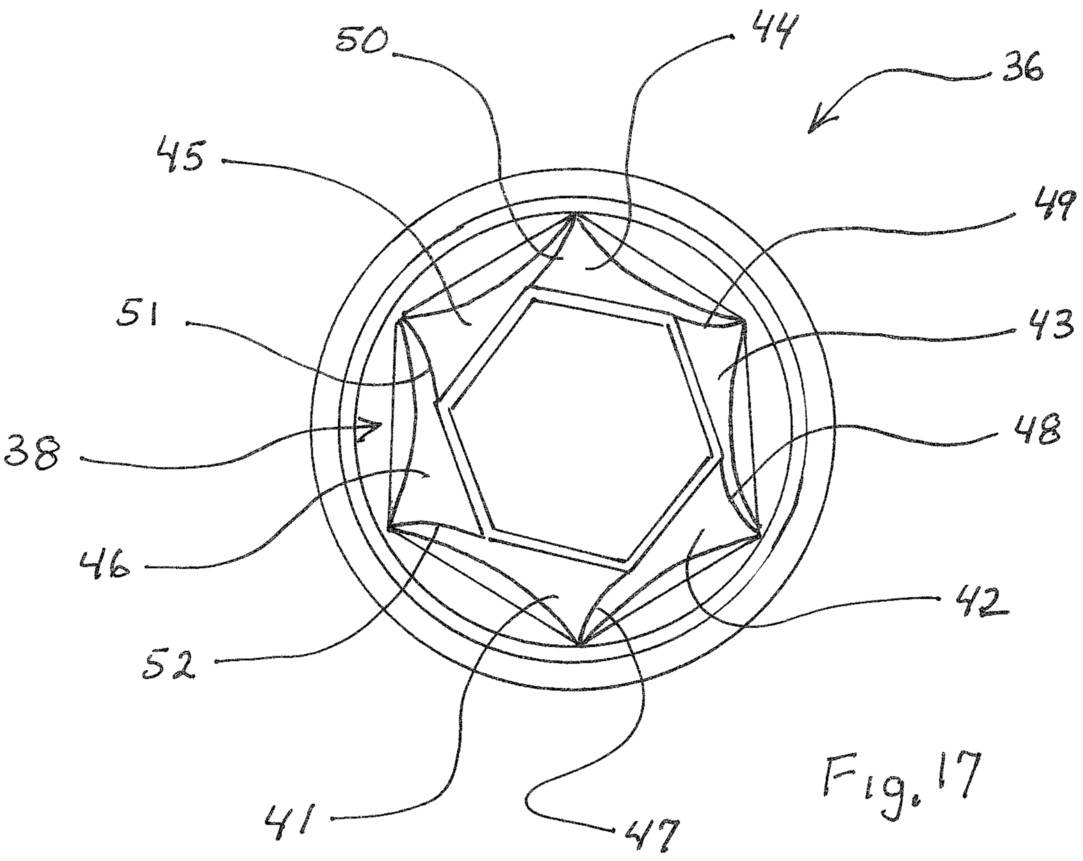
FIG. 17 is an enlarged top plan view thereof.

It will be evident that each of the alternating contoured inclined engagement surfaces 41-46 are transversely concave extending between the respective intersections of the adjacent abutting engagement surface, best seen in FIG. 17 of the drawings.

Figure 18:
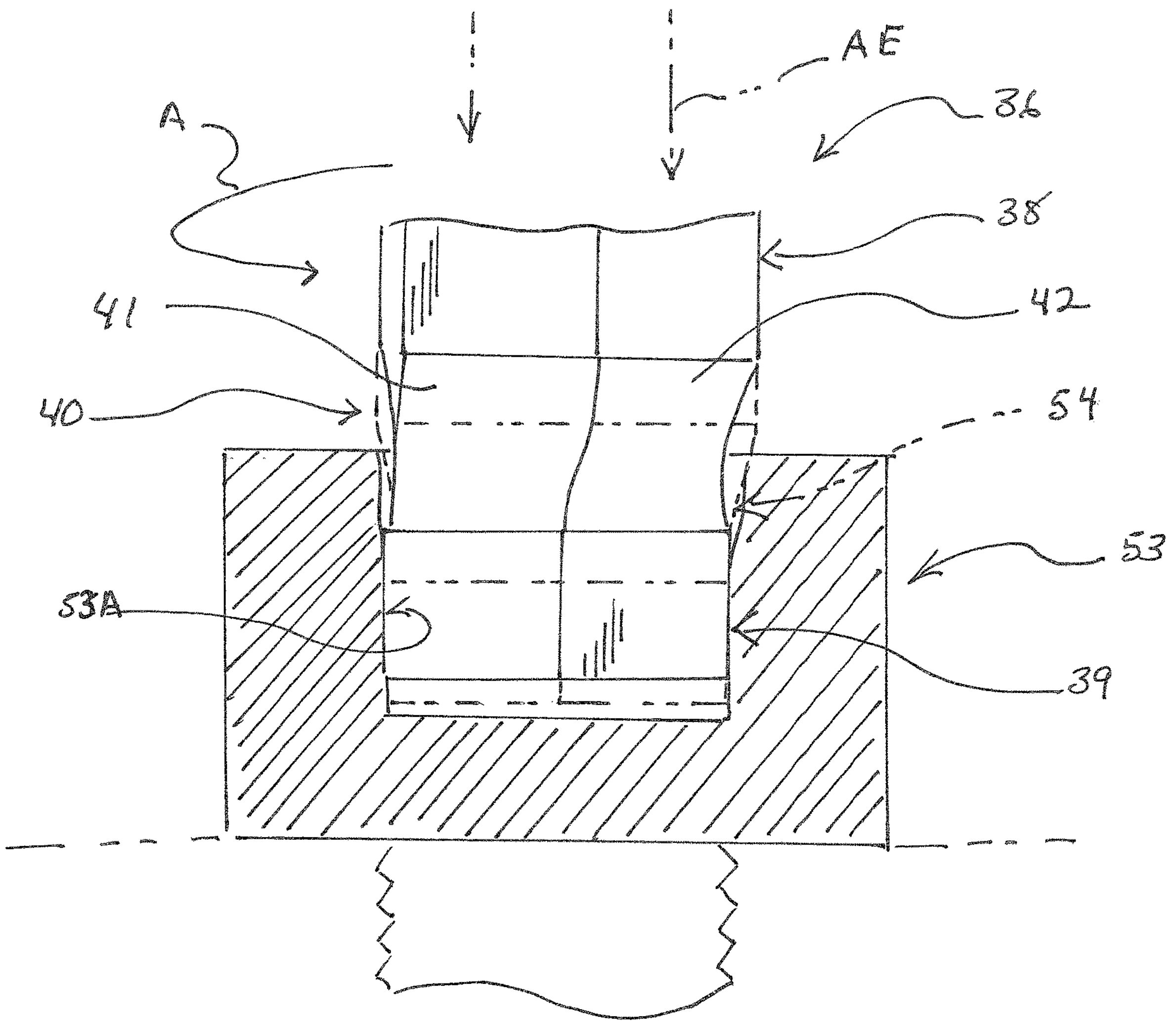
FIG. 18 is an enlarged partial front elevational view thereof in solid and dotted lines engaging in a damage fastener.
Figure 19:
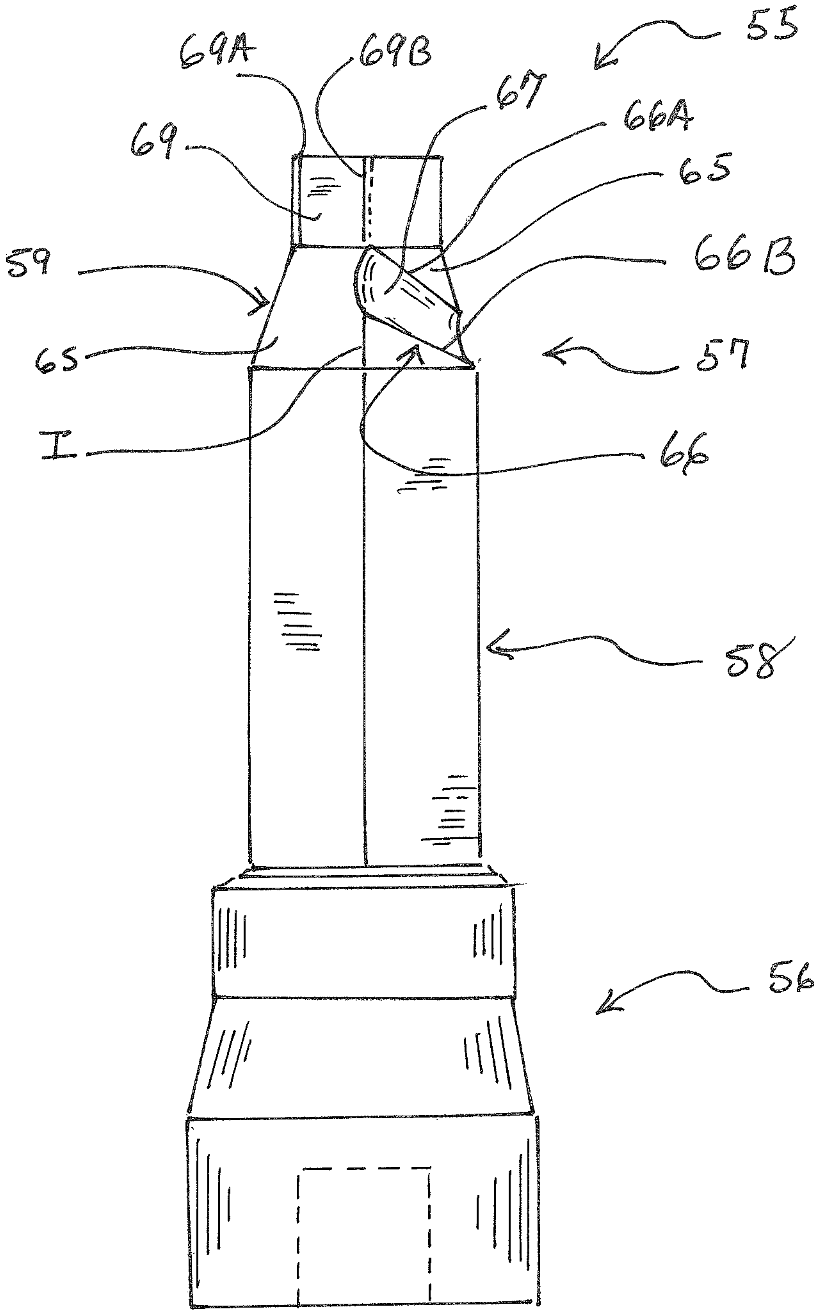
FIG. 19 is an enlarged front elevational view of a third alternate form of the anti-slip hex socket bit of the invention.

The corresponding surface intersections define upstanding elongated curved fastener engagement edges 47-52 which are in annular spaced relation to one another. The orientation and defined shape of the respective engagement edges 47-52 will provide progressive engagement within a damaged fastener 53 as illustrated in FIG. 18 of the drawings upon initial axial engagement indicated by broken arrow AE and then progressive annular rotation indicated by directional arrow A.

Under hex tool rotation, the progressive hex tool fastener engagement depth increases imparting increased torsional force against the damaged fastener 53 indicated at 54. The orientation and defined shape of the curvilinear engagement edges 47-52 will thus provide improved progressive torsional engagement within the damaged fastener 53 to that of the previous secondary forms, the anti-slip socket hex end bits 10 and 19 of the invention as hereinbefore described.

The progressive tool engagement will correspond to the longitudinal tapered engagement surfaces 40 insertion depth and fastener surface 53A engagement.

Referring now to FIGS. 19-23 of the drawings, an alternate form can be seen as an anti-slip socket box end hex bit 55 of the invention having a tool engagement portion 56 and an oppositely disposed hex shank fastener engagement socket portion 57 with a plurality of equal dimension hexagonal elongated flat engagement surfaces 58 there about.

Figure 20:
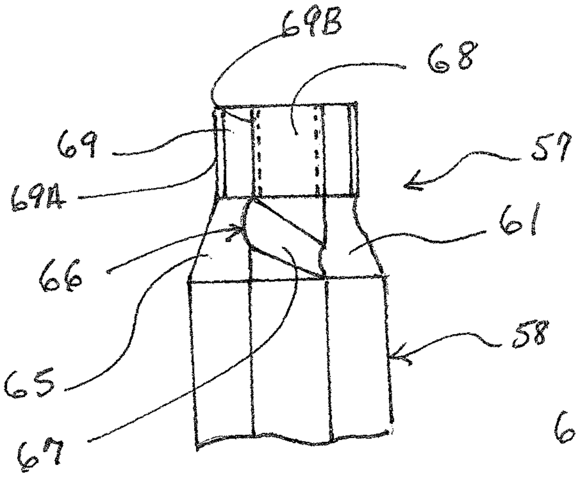
FIG. 20 is an enlarged partial front elevational view thereof.
Figure 21:
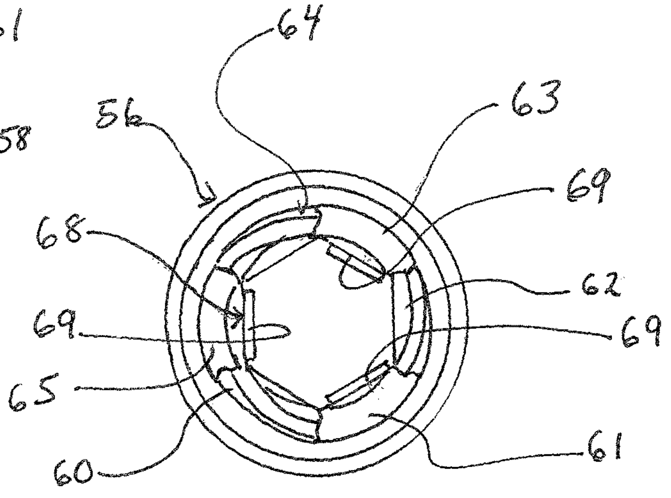
FIG. 21 is an enlarged top plan view thereof.
Figure 22:
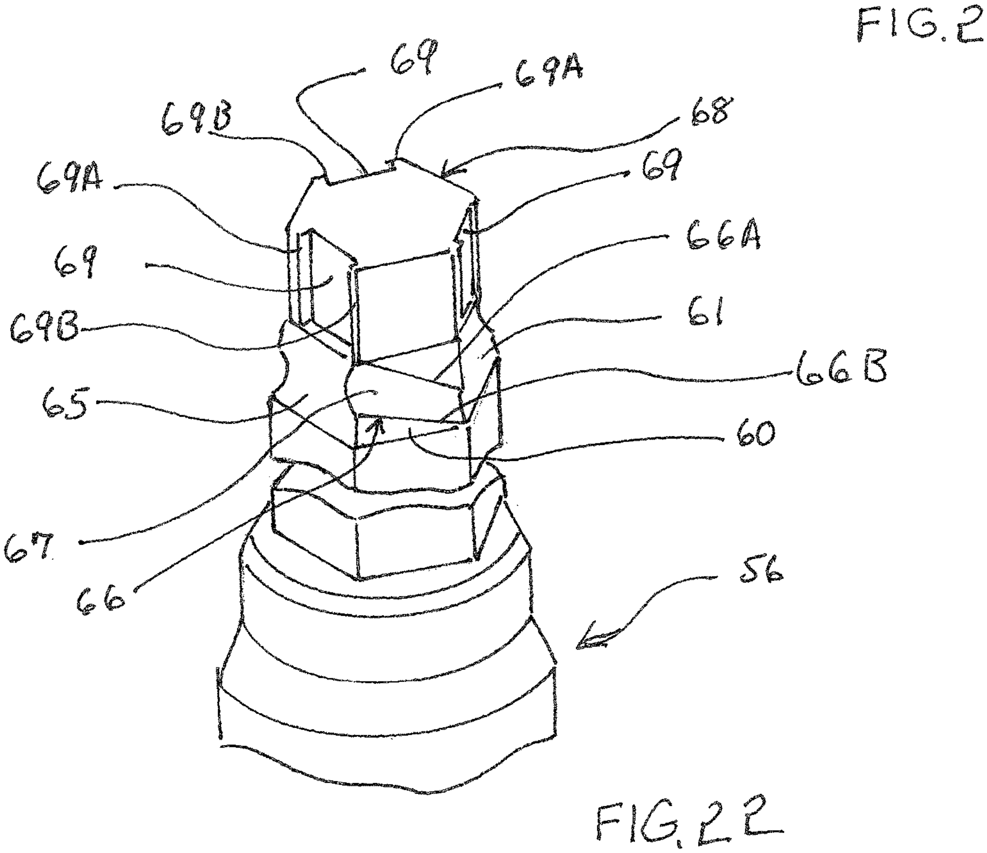
FIG. 22 is an enlarged top partial perspective view thereof.
Figure 23:
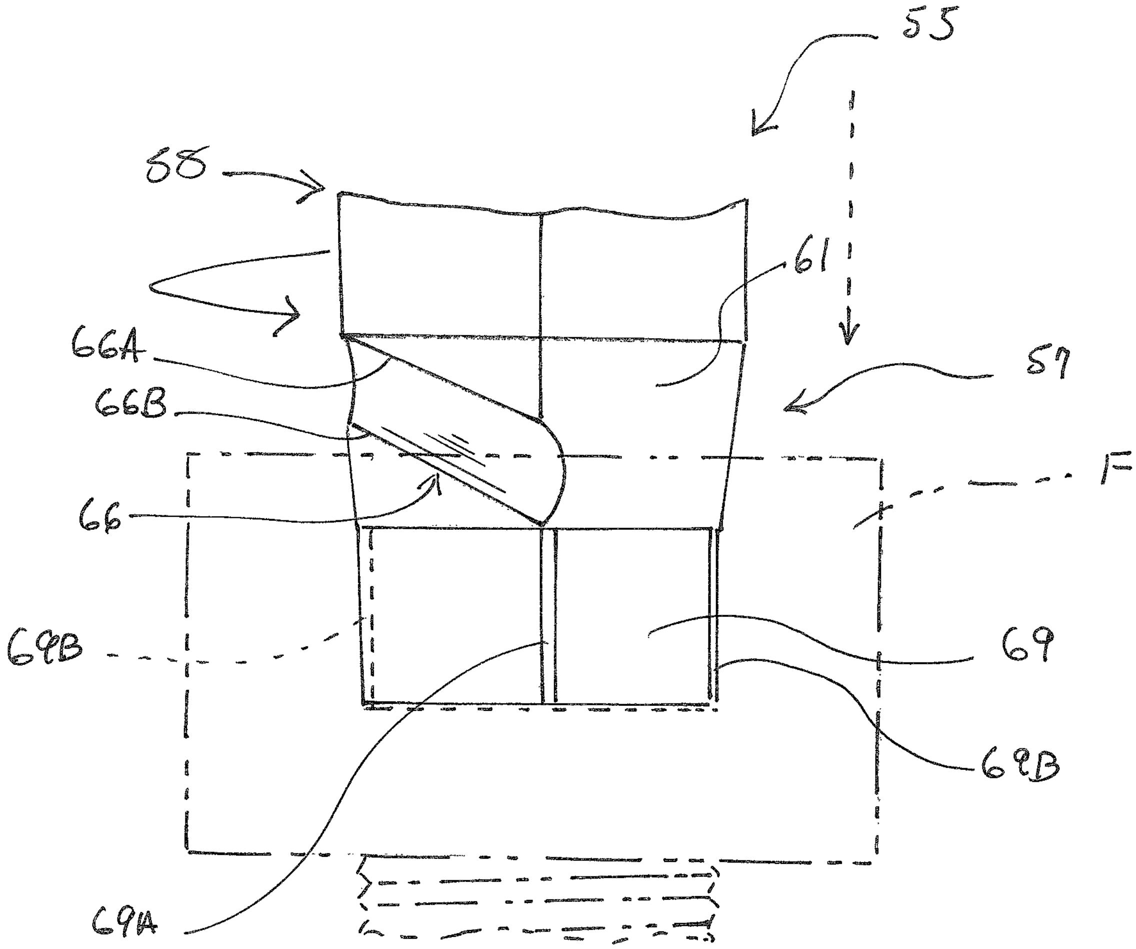
FIG. 23 is an enlarged partial front elevational view thereof engaged in a damaged fastener.

A secondary set of flat engagement surfaces 59 are tapered longitudinally therefrom defining individual incline engagement surfaces 60-65 spaced there about, best seen in FIGS. 20 and 21 of the drawings. Each alternating secondary flat engagement surfaces 60, 62 and 64 have a contoured C-shaped fastener engagement channel 66 cut therein with upstanding elongated fastener engagement edges 66A and 66B. Each contoured engagement channel 66 extends angularly across the respective tapered hexagonal surfaces 59, each having a contoured transverse tapered interior surface 67 which extends longitudinally between the respective intersections I of the inclined engagement surfaces 59.

The hex shank fastener engagement socket portion 57 has hexagonal elongated flat engagement surfaces 68. Each of the respective alternating upstanding hexagonal flat engagement surfaces has a centered recessed area 69 respectively therein defining corresponding pairs of oppositely disposed spaced parallel engagement edges 69A and 69B, best seen in FIGS. 21 and 22 of the drawings. It will be evident that the combination of the contoured C-shaped fastener engagement channel 66 with the now defined engagement edges 66A and 66B which are in alternate orientation thereto will provide improved fastener engagement as seen graphically in FIG. 23 of the drawings.

It will be seen that this combination orientation of flat engagement surface 68 with multiple selective positioning of sequential engagement of the inclined curvilinear edge surfaces 66A and 66B and as set forth in the third alternate form 53 with the alternate hex surface recesses 69 and their corresponding engagement edge surfaces 69A and 69B thereby provide progressive multiple points of enhanced focus tool engagement regardless of fastener condition in a rotational direction provided superior grip and holding currently unavailable within the art.

It will thus be seen that a new and useful anti-slip socket wrench hex head bit configuration has been illustrated and described and it will be apparent to those skilled in the art that various changes and modifications may be made therein without departing from the spirit of the invention.

We claim:

1. A directional multi-grip socket bit for hexagonal fasteners comprises, a screw bit body having a fastener engagement free end portion and a tool engagement end portion, a plurality of flat fastener engagement surfaces about said fastener engagement free end portion defining hexagonal engagement shank, alternating recessed areas centered in said respective flat fastener engagement surfaces having spaced parallel engagement edges, a set of longitudinally tapered flat engagement surfaces extending from said free end flat fastener and engagement surfaces, alternating contoured fastener engagement channels extending angularly across said respective longitudinally tapered flat engagement surfaces, said set of longitudinally tapered flat engagement surfaces are in longitudinal alignment with said respective free end flat fastener engagement surfaces.

* * * * *